UNITED STATES PATENT OFFICE.

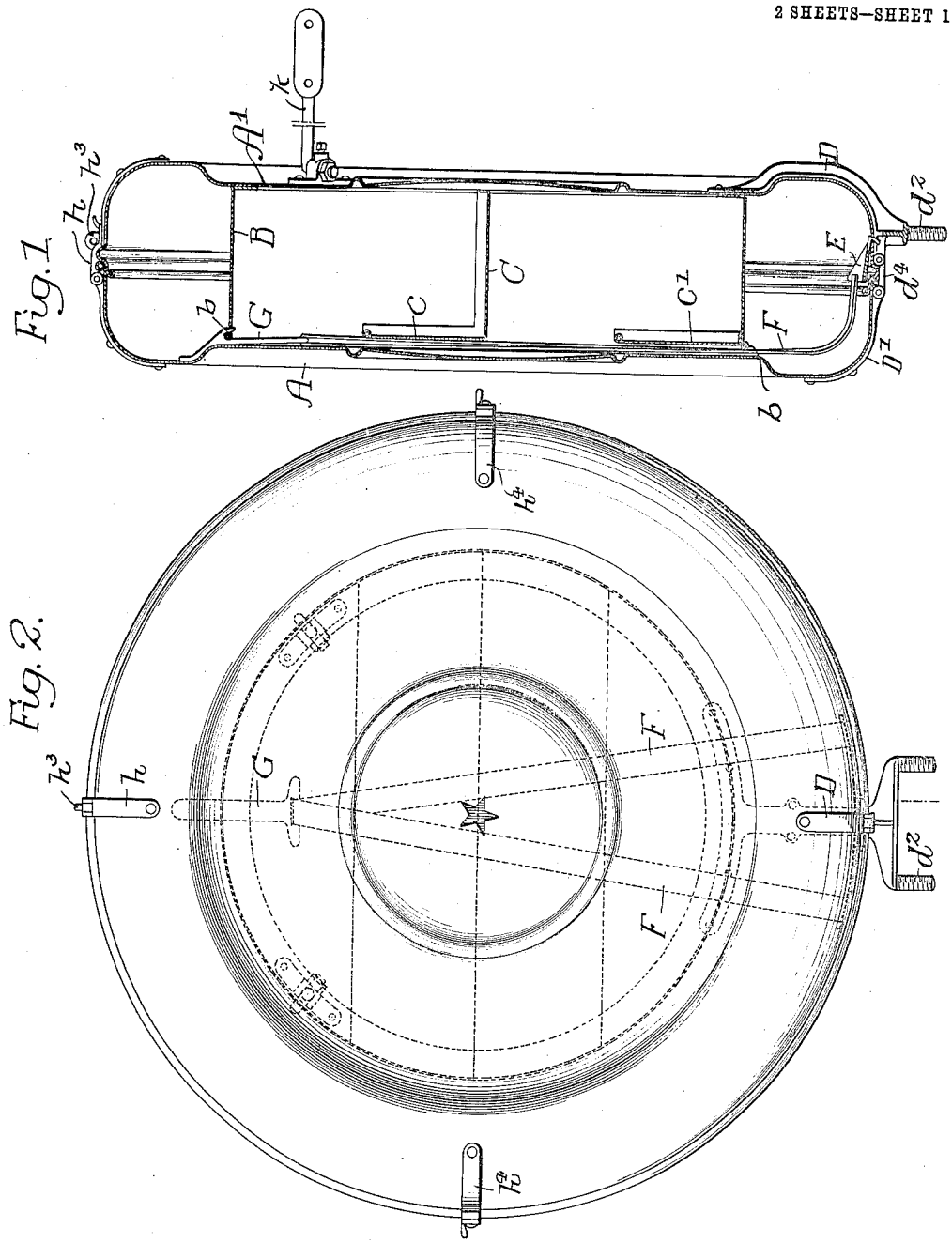

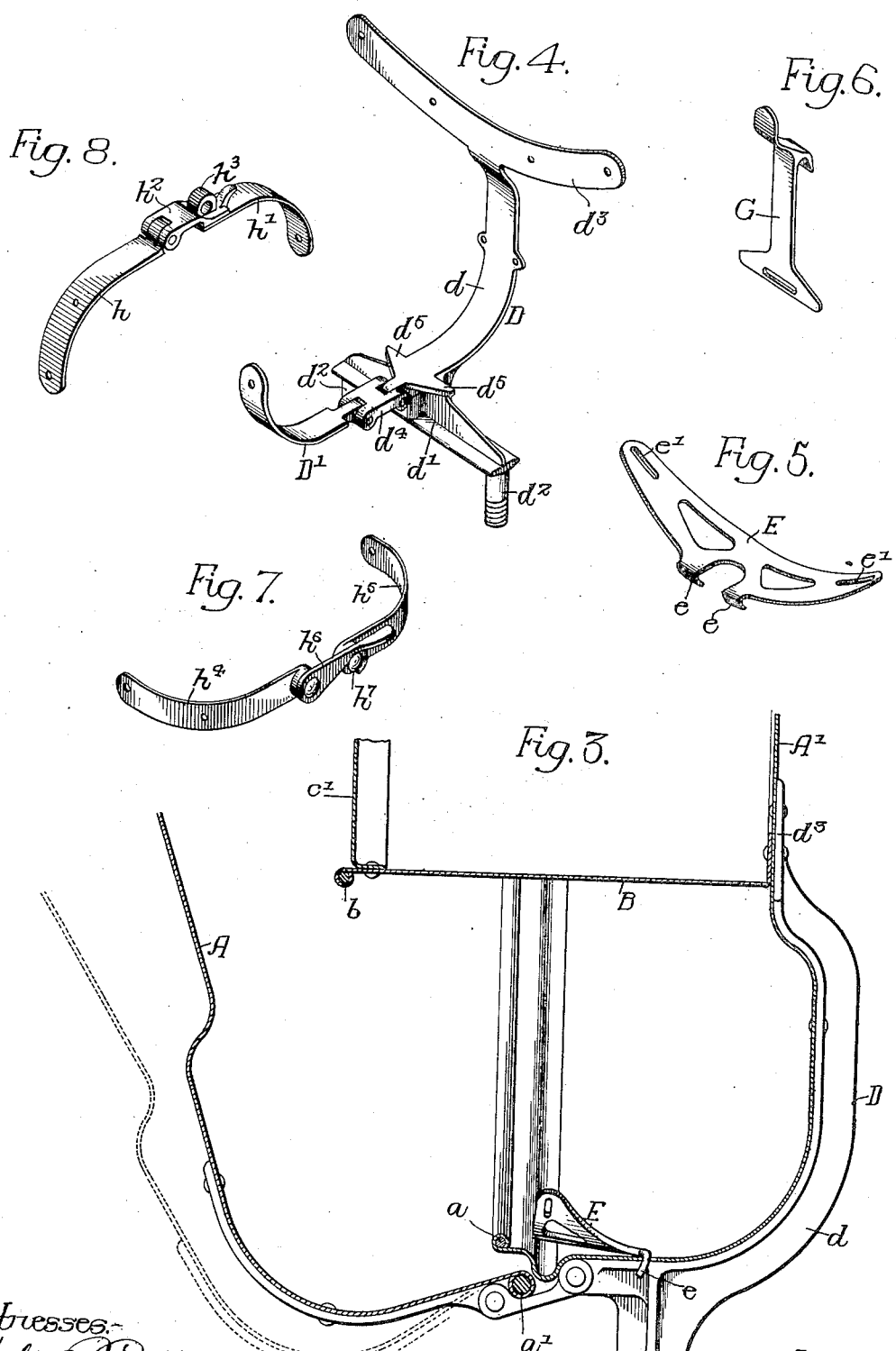

POWELL EVANS, OF PHILADELPHIA, PENNSYLVANIA.

TIRE-CASE.

935,647.

Specification of Letters Patent.

Patented Oct. 5, 1909.

Application filed January 2, 1909. Serial No. 470,314.

*To all whom it may concern:*

Be it known that I, POWELL EVANS, a citizen of the United States, residing in Philadelphia, Pennsylvania, have invented certain Improvements in Tire-Cases, of which the following is a specification.

My invention relates to receptacles for the reception of tires or shoes and tools, etc., the case illustrated being of the type ordinarily employed on motor vehicles, and constructed in the general form broadly described and claimed in my pending application for U. S. Patent #400,254, filed November 1, 1907.

One object of the present invention is to provide improved supporting and strengthening or bracing means for the tire case; another object being to provide novel reinforcing means for distributing the weight of the tire or tires carried in the case, so that these shall be tightly held in position, and their weight carried by certain desired members of the case and at different portions thereof.

It is further desired to provide a tire case which shall be relatively light in construction and which may be quickly opened and closed; the tire supporting means being of such a nature as to be conveniently applied to and removed from the case in order to place therein or remove from it a tire or tires.

These objects and other advantageous ends I secure as hereinafter set forth, reference being had to the accompanying drawings, in which:—

Figure 1, is a vertical section of my improved tire case; Fig. 2, is a side elevation of the same; Fig. 3, is a vertical section on an enlarged scale of the bottom portion of the tire case; and Figs. 4 to 8, inclusive, are perspective views of various details of the device.

In the above drawings A and A' represent the two main parts of the tire case, and it will be noted that each of them consists of a circular plate of relatively thin sheet material having a flange so formed that said two structures together form a flat cylindrical container.

The plates have their central portions dished or pressed inwardly for a short distance so that the central part of the container is of less thickness than the outer or peripheral portions thereof. These two portions are divided from one another by a cylindrical partition B mounted concentrically within the case and permanently fastened to one of the parts thereof. In addition to its function as a partition, the member B also serves as a reinforcing structure for the tire case, as well as a means for directly supporting one or more tire shoes. From the drawings it will be seen that it is flanged and that there is riveted or otherwise attached to the material of the member A', either directly into this flange or immediately adjacent thereto, two rods or bars $k$ designed to rigidly hold the tire case to the body of the motor vehicle on which it is used. Also fastened to said member A' is a second partition C which extends transversely of the space within the partition B so as to divide this into two semicylindrical chambers the front edge of this partition C being upwardly turned as indicated at $c$. There is also fastened to the lower part of the interior surface of this cylindrical partition B an upwardly extending edge piece $c'$, which with the part $c$ of the partition C serves to retain various articles such as tools, inner tubes, etc. within the two central chambers of the tire case.

From Fig. 3 it will be noted that the part A of the tire case is hinged at its lowermost portion to the part A' and for the purpose of supporting and bracing the whole structure I provide a casting or forging D constituting a base member which, as shown best in Fig. 4, consists of a vertically extending body portion $d$ curved to fit the outside surface of the lower part of the tire case and preferably having a T-shaped or angle section. At its lower end this base member is provided with a base portion $d'$ which extends at right angles to the part $d$ and has at its ends two threaded bolt like extensions $d^2$, designed to pass through the running board of a motor vehicle and receive nuts whereby the base piece D and its attached tire case are rigidly held in position. The upper end of the main part $d$ of this piece D is laterally extended, as indicated at $d^3$ and is rigidly attached by riveting or otherwise to the flat central portions of the member A'; the connection in the present instance being made not only through this part but also through or immediately adjacent to the flange of the cylindrical partition or reinforcing member B, and it will be noted that the outer or free edge of this partition is strengthened and the whole structure braced by said edge being turned over or beaded; there being also in said bead a rod or wire $b$. The same is true of the free edges of the sections A and A', which are similarly provided with beads and reinforcing wires, as shown at $a$ and $a'$. There is riveted or otherwise attached to the bottom portion of the member A a curved piece D', and this is pivoted or movably pinned to a connecting link $d^4$, similarly connected to the piece D.

For transmitting the weight of the heavy tire or tires carried in the case to the base piece D independently of the relatively light material of the members A and A', as well as for tightly holding these articles from movement within the tire case, I provide a sling including a plate E having hooks $e$ capable of passing through openings in the bottom of the tire case. Said hooks are designed to directly engage projections $d^5$ of the base piece D and said plate E has its ends provided with slots $e'$ for the reception of the two ends of a strap F. This strap is designed to pass upwardly between the faces of the turned up edges $c$ and $c'$, along the inner surface of the central portion of the member A and is attached to a hook G. Said hook is shaped to fit against the inside curved surface of the member A and its point passes over the bead $b$ of the partition B, entering a suitably placed opening therein.

The two members A and A' of the case are held together in their closed position by means of three locking devices, the first of which consists of two straps $h$ and $h'$, riveted or otherwise connected to the tops of said members; one of the parts having a swinging catch $h^2$ designed to engage a hasp $h^3$ on the other one. At the middle of each side of the members A and A' are also attached two straps $h^4$ and $h^5$, to one of which is pivoted a latch $h^6$ constructed to engage a headed pin $h^7$ on the other.

Under conditions of use, tools, inner tubes and any other desired supplies may be placed in the two compartments formed within the partition B, while one or more tires or shoes may be mounted in the annular space outside of said partition. The hook G having been first disengaged from the upper edge of the partition B, the tires are placed in the space so that one of them will rest partly on the plate E and another on the lower end of the strap attached to said plate. The said hook G is then brought into engagement with the beaded edge of the partition B and is of such a length that in order to so attach it the two tires are raised so as to be supported thereby. The weight of said tires is almost wholly transmitted by the sling to the top portion of the reinforcing member formed by the partition B and this being of a cylindrical form, is well fitted to sustain such weight, which it transmits to the laterally extending portions $d^3$ of the base piece D. The plate E transmits directly to the base piece any load which may be imposed by a tire or tires resting upon it. As a consequence, there is practically no strain brought to bear upon the relatively light sheet metal of which I preferably make the two members A and A', and in addition, since the two tires are supported by the two lengths of the strap as above described, there is no possibility of their injuring the tire case or of their becoming injured by possible movement within said case. Moreover, the case is prevented from lateral movement by the holding rods $k$, which as above noted, are attached directly to the reinforcing member formed by the partition B. It will further be noted that owing to the peculiar form of hinge employed between the two members A and A', these are permitted to open or separate in a manner giving quick access to the interior of the case as well as causing a maximum opening, for when the parts of the case are first separated, they move relatively to each other upon the pin between the parts D and $d^4$, and later upon the pin between the parts $d^4$ and D'.

I claim:—

1. A tire case made of relatively thin sheet material and having within it a reinforcing structure, with a supporting base connected to said reinforcing structure so as to directly receive any load applied to the same.

2. A tire case made of relatively thin material and having within it an annular partition dividing it into a plurality of chambers, with a supporting base connected to said partition so as to directly receive any load applied to the same.

3. The combination in a tire case of two members of relatively thin sheet material shaped to form a flat cylindrical container, a reinforcing structure for the case fastened to one of said members, and a base member also fastened to said member and arranged to receive any weight applied to said reinforcing structure independently of the body of the case.

4. The combination in a tire case of two members formed of relatively thin sheet material and shaped to constitute a container for tires, a reinforcing structure for said container, a base member attached to one of the members and provided with an upwardly projecting arm having a lateral extension connected to the reinforcing structure so as to directly receive any weight applied to said structure.

5. The combination in a tire case of two members formed of relatively thin sheet material and shaped to constitute a container for tires, an annular partition within said container, a base member attached to one of the members and provided with an upwardly projecting arm having a lateral extension connected to said partition so as to have transmitted to it any weight applied to the partition.

6. The combination in a tire case of a container having a reinforcing structure, with a device placed within said container to support a tire or tires and transmit the weight of the same to said reinforcing structure.

7. The combination in a tire case of a container having an internal partition dividing it into a plurality of chambers, and a device placed within the container to support a tire or tires and transmit the weight of the same to said partition.

8. The combination of a casing forming a tire container, a base therefor, a device placed within the casing to engage the lower portion of the tire and transmit the weight thereof to the upper part of said casing, and means for transmitting said weight from the upper part of the casing to the base structure independently of the main portion of said casing.

9. The combination of a container having within it a reinforcing structure, a base piece arranged to receive from said reinforcing structure any weight applied thereto so as to support the same independently of the lower portion of the container, and a device within the container for carrying a tire or tires and transmitting the weight thereof to said reinforcing structure.

10. The combination of a container having within it a reinforcing structure, with a sling in the lower portion of the container for the support of a tire or tires, said sling being connected to the upper part of the reinforcing structure.

11. The combination in a tire case of a container having within it an annular partition, with a strap connected to the top of the partition and to the lower portion of the container so as to carry a tire or tires.

12. The combination in a tire case of a container having a reinforcing structure a base piece arranged to support a load from said structure independently of the lower portion of the container, with a strap having lugs at its ends of which one is placed to engage the base piece and the other to engage the upper portion of the reinforcing structure.

13. The combination in a tire case of a container having within it an annular partition, a base piece connected to said partition, a plate having means for connecting it to said base piece, a hook capable of engaging the upper part of the partition, and a strap passing through said hook and having its end attached to said plate.

14. The combination in a tire case of a base member, a container made in two parts of which one is rigidly connected to said base member, and a hinge piece connected to the base member and to the bottom of the other part of the container.

15. The combination in a tire case of a base member, a container made in two parts of which one is rigidly connected to said base member, two hinge pieces rigidly attached to the bottom parts of the two portions of the container respectively and a link connecting said two hinge pieces.

16. The combination in a tire case of a container, a reinforcing member for said container, with a base piece and two side supporting members connected to said reinforcing member for holding the case in position.

In testimony whereof, I have signed my name to this specification, in the presence of two subscribing witnesses.

POWELL EVANS.

Witnesses:
 WILLIAM E. BRADLEY,
 JOS. H. KLEIN.